April 27, 1943.    L. J. ALGER    2,317,873
TRIAL FRAME
Filed March 18, 1942
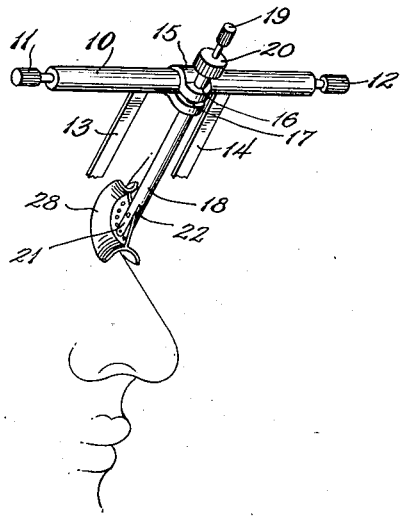
Fig.1
Fig.2
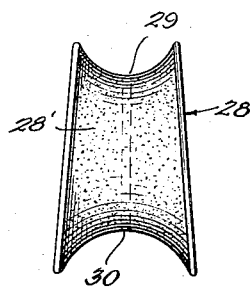
Fig.3
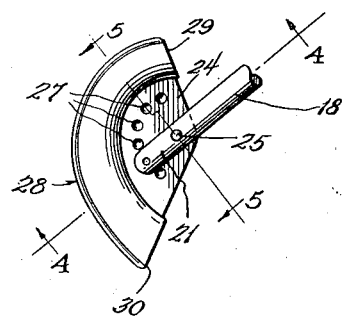
Fig.4
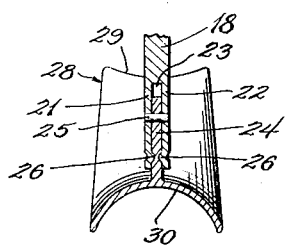
Fig.5
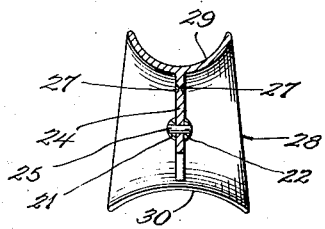
Inventor
Leon James Alger
By Francis H. Templeton
Attorney Patented Apr. 27, 1943

2,317,873

UNITED STATES PATENT OFFICE 2,317,873

TRIAL FRAME

Leon James Alger, Grand Forks, N. Dak.

Application March 18, 1942, Serial No. 435,229

3 Claims. (Cl. 88—51)

This invention relates generally to trial frames intended to be supported by nose rests on the nose and to be used for holding lenses in position to determine the optical needs of the eyes.

My invention more particularly relates to the provision of a trial frame, both simple in construction and efficient in operation, which is adapted for quick and easy adjustment of the comfortable and secure surface of the nose rest so as to conform to the contour of the bridge of any nose.

Various other objects and advantages of this invention will be obvious from the following particular description of an embodiment of my invention.

The various features of novelty which characterize my invention are pointed out with particularity in the claims, annexed to and forming a part of this specification, but for a better understanding of the invention, however, its advantages and specific objects attained with its use, reference should be had to the accompanying drawing and descriptive matter in which I have illustrated and described the best form of my invention.

Of the drawing:

Fig. 1 is a perspective view of a trial frame embodying my invention.

Figs. 2 and 3 are rear and side elevations, respectively, of my nose rest.

Fig. 4 is a sectional view on the line 4—4 of Fig. 3.

Fig. 5 is a sectional view on the line 5—5 of Fig. 3.

Referring to Fig. 1 of the drawing, the horizontal tube 10 contains mechanism operated by knurled finger pieces 11 and 12 for moving, respectively, arms 13 and 14, from which depend trial lenses (not shown), thereby given back and forth movement, independent of each other, for desired adjustment in front of the eyes (not shown).

Secured to horizontal tube 10, preferably centrally thereof, is a U-shaped bracket 15 having its opposite ends provided with axially-alined openings 16 and 17 through which rod 18 is vertically slidable by rotating knurled knob 19 and then locked in adjusted position by lock nut 20.

The rod 18 has legs 21 and 22 formed by a slot 23 extending from the lower end thereof and having a length and a width sufficient to receive the web 24 of the nose rest, but preferably with frictional contact of the legs 21 and 22, throughout the length thereof, with the web 24.

Projecting through alined openings in web 24 and legs 21 and 22 is a hinge pin 25 for pivoting the nose rest on the rod 18.

Near the free end thereof, each of legs 21 and 22 has its inner face provided with a projection or detent 26, so positioned as to engage in one of a series of depressions 27 formed in web 24 and arranged in the arc of a circle, the center of which is pin 25.

Secured to web 24 is that portion of the nose rest which directly engages the nose, and which, being of somewhat rim-like shape, is called the rim 28, which is shown knurled or roughened, as at 28'.

Although symmetrical with respect to the web 24 and concave throughout the length thereof, the rim 28 has cross-sectional shapes varying from the shorter radius, indicated by 29, at one end increasing gradually to the relatively greater radius, indicated by 30, at the opposite end, so as to conform to the surface of a nose with any bridge varying between a sharp bridge and a broad bridge.

Thus, by rotating the nose rest upon the axis provided by the hinge pin 25, it is possible to place that portion of the rim 28 of the nose rest upon the bridge of the nose where the radius best conforms to the bridge of the nose.

The nose rest is retained in such desired adjusted position, not only by the frictional contact between the web 24 and the legs 21 and 22, but also by the detents 26 engaging in the particular depressions which happen to lie opposite by reason of the adjusted angular position of the nose rest.

As shown in the drawing, the pivot pin 25 does not coincide with, but is located above, the center of the circle of which the web 24 is a segment, so that when engaged by the "short radius" end 29 of the rim, the nose lies a shorter distance from pivot pin 25 than if engaged by the opposite or "long radius" end 30 of such rim.

I claim:

1. In an ophthalmic mounting, the combination of a support, a nose rest comprising a relatively flat body having a convexly curved edge, said edge being concave transversely, the radius of concavity varying circumferentially of said body, and means for pivoting the nose rest relative to the support on an axis extending transversely of the support, for bringing a selected area of said edge into engagement with the bridge of the nose.

2. In an ophthalmic mounting, the combination of a support, a nose rest comprising a relatively flat body having a convexly curved edge, said edge being concave transversely, the radius of concavity varying circumferentially of said body, means for pivoting the nose rest relative to the support on an axis extending transversely of the support, for bringing a selected area of said edge into engagement with the bridge of the nose, and means for locking said pivot means, whereby the nose rest may be set and locked in position.

3. In a trial frame, the combination of a support, a nose rest comprising a web portion and a convexly-curved rim portion, said rim portion being concave transversely, the radius of concavity varying circumferentially of said web portion, and means for pivoting the nose rest relative to said support, for bringing a selected area of said rim portion into engagement with the bridge of the nose.

LEON JAMES ALGER.